Figure 1:
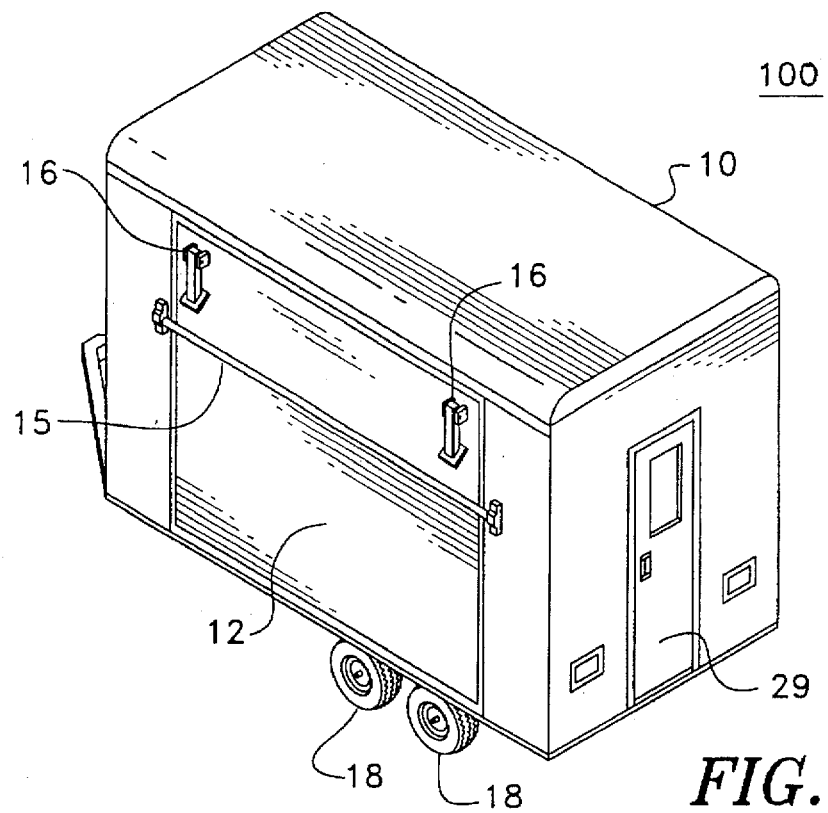

United States Patent [19]

Talucci

[11] Patent Number: 5,667,267
[45] Date of Patent: Sep. 16, 1997

[54] MOBILE FITNESS CENTER

[76] Inventor: John K. Talucci, 127 Gallagherville Rd., Downingtown, Pa. 19335

[21] Appl. No.: 601,849

[22] Filed: Feb. 15, 1996

[51] Int. Cl.⁶ .................................................. B62D 33/08
[52] U.S. Cl. .................................................. 296/26
[58] Field of Search .................................. 296/26, 172

[56] References Cited

U.S. PATENT DOCUMENTS

| Re. 32,262 | 10/1986 | Stewart | 296/171 |
|---|---|---|---|
| 2,384,659 | 9/1945 | Wait | 296/26 |
| 3,399,922 | 9/1968 | Burton | 296/26 |
| 4,310,194 | 1/1982 | Biller | 296/26 |
| 4,535,933 | 8/1985 | Kuiper | 296/26 |
| 4,689,924 | 9/1987 | Jurgensen | 52/67 |
| 4,958,874 | 9/1990 | Hegedus | 296/26 |
| 5,170,901 | 12/1992 | Bersani | 296/26 |
| 5,280,985 | 1/1994 | Morris | 296/26 |
| 5,310,209 | 5/1994 | Holman | 280/656 |
| 5,478,129 | 12/1995 | Goto et al. | 296/26 |

FOREIGN PATENT DOCUMENTS

| 54098 | 10/1974 | Australia | 296/26 |
|---|---|---|---|
| 1406611 | 6/1965 | France | 296/26 |

*Primary Examiner*—Gary C. Hoge
*Attorney, Agent, or Firm*—Duane, Morris & Heckscher

[57] ABSTRACT

Mobile fitness centers are provided which include a trailer having at least one expandable side portion to increase the floor surface of the trailer to improve the overall workout space and lessen the crowded feeling of a mobile unit. The fitness centers of this invention provide completely portable training facilities which can be equipped with almost as much equipment as provided by some gymnasiums or stationary fitness centers.

18 Claims, 2 Drawing Sheets

MOBILE FITNESS CENTER

FIELD OF THE INVENTION

This invention relates to mobile trailer for providing on-site training facilities, and more particularly to trailers that can be adapted to provide sufficient space for a number of training or workout stations.

BACKGROUND OF THE INVENTION

More and more people are becoming more attentive to their physical well-being. Gym memberships have been increasing, and exercise is widely regarded as an essential ingredient in cardiac care. While many of us acknowledge the need to exercise, our busy schedules often make it difficult to go to a gymnasium. Accordingly, many of us miss the exercise that we need to stay fit.

The prior art is replete with numerous vehicles for transporting displays and providing exhibition areas for products and performance. Examples include U.S. Pat. Nos. 4,958,874, 5,310,209, Re. 32,262, 4,689,924 and 5,280,985.

While these mobile expandable structures have been suggested for broadcasting field events, vacation use and merchandising, there is a limited availability of mobile units in the marketplace for providing convenient access to gym equipment for busy individuals. One such unit is called FITNESS-to-GO and is essentially a gym on wheels. This device is an actual truck with a small amount of workout equipment.

SUMMARY OF THE INVENTION

This invention provides mobile fitness centers which include one or more pieces of training equipment, for example, weights, stationary bicycles or rowing machines. These fitness centers include a trailer having top, bottom, front and back portions along with a pair of longitudinal sides. They further include at least one movable panel which can be adjusted from a first position forming part of one of the longitudinal sides, to a second position which forms an extended floor for providing more surface for exercise equipment and training.

The trailer of this invention can open up and become much larger than conventional portable U-Haul type units. In one embodiment, the floor space can be over 350 square feet which can provide room for a wide variety of exercise equipment. This device can greatly reduce the resistance of those whom have not committed to a regular regimen of exercise.

In further embodiments of this invention, a trailer is provided with a hinged side panel having one or more jacks for supporting the panel in the open position so as to provide a firmly supported extended floor. The extended floor area can also be protected by a removable roof cover supported by a pole support structure.

A BRIEF DESCRIPTION OF THE DRAWINGS

Figure 2:
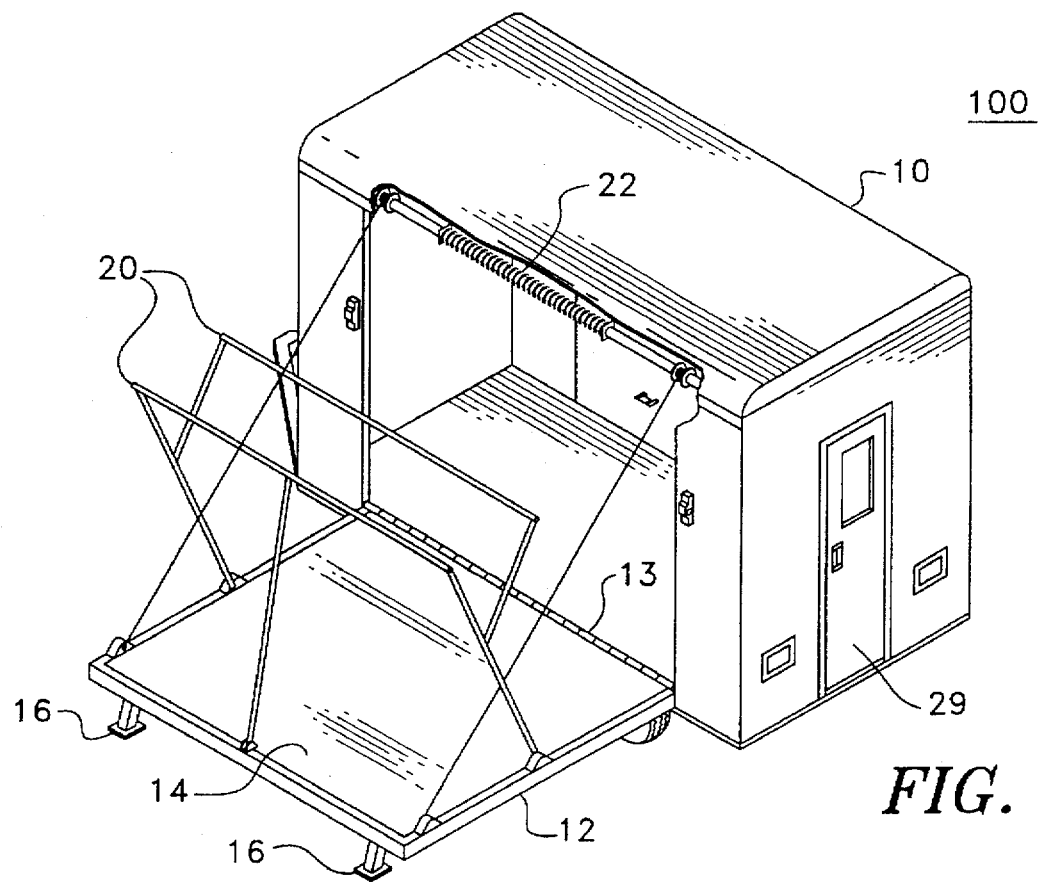
Figure 3:
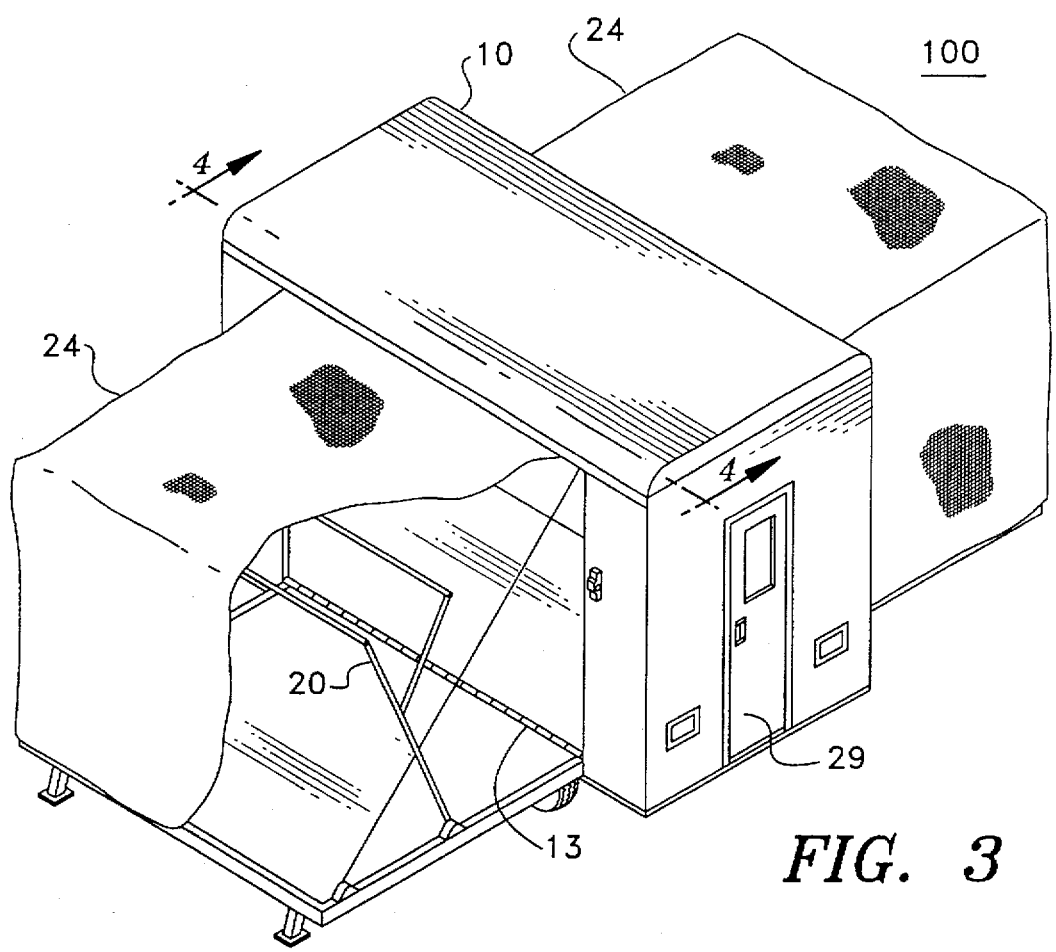
Figure 4:
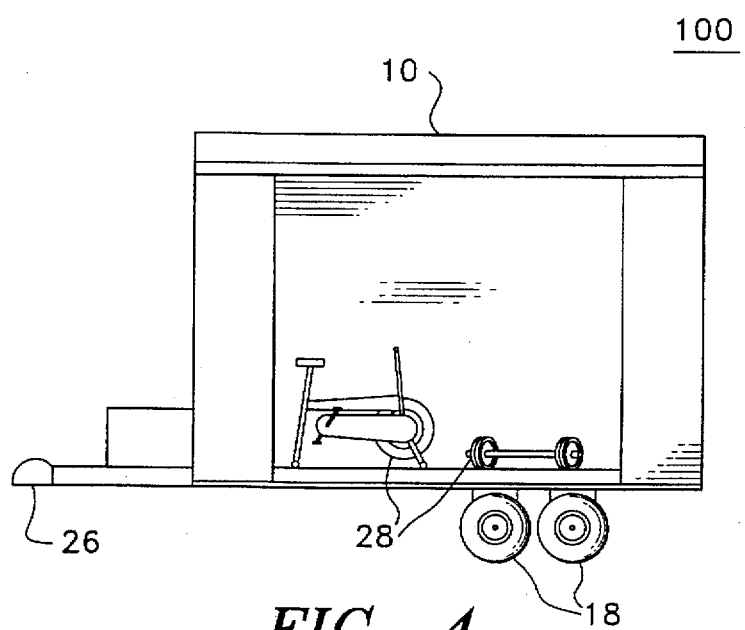

The accompanying drawings illustrate preferred embodiments of the invention according to the practical application of the principals thereof, and in which:

FIG. 1: is a top perspective view of a preferred mobile fitness center of this invention;

FIG. 2: is a top perspective view of the mobile fitness center of FIG. 1 in which an expandable side panel has been opened to create greater floor space;

FIG. 3: is a top perspective view of the mobile fitness center of FIG. 1 showing a pair of expandable side panels covered in a canvas material, with a cut away portion of one of these covers exposing a roof support pole structure; and FIG. 4: is a cross-sectional side view taken through line 4—4 of FIG. 3 showing various pieces of fitness equipment.

A DETAILED DESCRIPTION OF THE INVENTION

Mobile fitness centers having expandable side portions for greatly increasing the amount exercise space are provided by this invention. The centers can be conveniently transported to an office building or factory to provide easy access for clients and patients.

With respect to the figures and particularly FIGS. 1–3 thereof, there shown a preferred mobile fitness center 100. The fitness center 100 of the preferred embodiment includes a trailer 10 having generally rectangular configuration including a pair of longitudinal sides, top and bottom portions, and front and back portions. The trailer can be provided with heating and cooling equipment, and can be wired for stereo music. Accommodations usually provided in a home-like setting can be provided, such as a water supply, carpeting and windows.

In an important aspect of this invention, the trailer 10 comprises at least one expandable side panel 12. In this embodiment, the side panel 12 is connected by a hinge 13 to the bottom portion of the trailer. The side panel 12 has a first position which forms a portion of the one of the longitudinal sides, and a second portion which provides an extended floor portion for the trailer. In the first position, a safety bar 15 can be provided to secure the movable panel during travel. When the safety bar 15 is released, a spring winding mechanism 22 connected to a pair of cables permits the expandable side panel 12 to descend in a controlled manner. Jack means illustrated as a pair of hinged jacks 16 can be disposed on the expandable side panel 12 to support it from a ground surface when the side panel 12 is in the second position.

Preferably the side panel forms a floor surface 14 which is coplanar with the remaining floor surface in the trailer 10, but this is not a requirement. Alternatively, instead of a hinge 13, the side panel 12 can be selectively removable and provided with a locking mechanism similar to the sliding ramps often provided in moving vehicles, such as those having an extended tab and slot locking arrangement.

The mobile fitness center 100 of this invention further comprises roof support poles 20 which can be hinged to a peripheral region of the side panel 12 and opened to form a support structure for canvas covers 24 or plastic covers, as shown in FIG. 3. This will provide an extended and enclosed exercise area slightly over 350 square feet which can be heated or cooled to provide added comfort for patients and clients. An access doorway 29 can be included in the back portion of the trailer for easy entrance and egress to and from its enclosed area.

As shown in FIG. 4, the mobile fitness center of this invention should include at least one or more pieces of fitness equipment 28. In a preferred embodiment, the trailer 10 is equipped with four wheels 18 mounted to a pair of axles and suspended from the bottom portion of the trailer. A trailer hitch 26 is also provided which extends from a front portion of the trailer for mounting to the motor vehicle of suitable towing capacity.

What is claimed is:

1. A mobile fitness center, comprising:
    trailer means supported on at least two wheels having a top and bottom portion, front and back portions and a pair of longitudinal sides;

said longitudinal sides comprising at least one movable panel having a first and second position, in which the first position provides a part of one of said longitudinal sides of said trailer and said second position provides an extended floor surface of said trailer and, spring tension means for facilitating controlled motion of said movable panel from said first to said second position.

2. The mobile fitness center of claim 1 wherein said movable panel comprises hinge means for connecting said panel to said trailer.

3. The mobile fitness center of claim 1 wherein said movable panel comprises a first side forming said extended floor surface and a second side forming said portion of one of said longitudinal sides.

4. The mobile fitness center of claim 3 wherein said first side is substantially coplanar with a floor surface inside said trailer.

5. The mobile fitness center of claim 3 wherein said second side comprises jack means for supporting said movable panel above a ground surface.

6. The mobile fitness center of claim 1 wherein said spring tension means comprises a cable connected to an extended portion of said movable panel.

7. The mobile fitness center of claim 1 wherein said movable panel comprises support poles for supporting a removable cover disposed over a portion of said extended floor portion.

8. The mobile fitness center of claim 1 further comprising a second movable panel.

9. A mobile fitness center comprising a trailer having top and bottom portions, front and back portions and a pair of longitudinal sides, said longitudinal sides comprising at least one movable panel having a first position forming a portion of one of said longitudinal sides, and a second position which forms an extended floor surface for said trailer; said movable panel being connected to said trailer by a longitudinal hinge and comprising jack means for supporting said panel above a ground surface when in said second position said movable panel comprising a spring winding mechanism comprising a tension spring and cable.

10. The mobile fitness center of claim 9 wherein said trailer contains one or more pieces of fitness equipment.

11. The mobile fitness center of claim 10 wherein said spring winding mechanism comprises a rotating spindle and said cable is attached between a pair of ends of said spindle and a pair of corner portions of said movable panel.

12. The mobile fitness center of claim 9 wherein said jack means comprises a pair of hinged jacks located on an exterior-facing portion of said movable panel when said panel is in said first position.

13. The mobile fitness center of claim 12 further comprising an access doorway disposed on said back portion of said trailer.

14. The mobile fitness center of claim 9 further comprising a towing hitch extending from said front portion of said trailer.

15. The mobile fitness center of claim 9 further comprising a second movable panel disposed along a second longitudinal side of said trailer.

16. The mobile fitness center of claim 9 further comprising a pair of wheels joined together by an axle and attached by a supporting structure to said bottom portion of said trailer.

17. A mobile fitness center comprising a trailer having a generally rectangular configuration having a pair of longitudinal sides comprising hinged panels, each of said hinged panels providing a first position which is generally coplanar with said longitudinal sides of said trailer, and a second position which extends laterally outward to form an extended floor surface for said trailer; a first of said hinged panels comprising spring tensioning means for facilitating controlled motion of said first hinged panel.

18. The mobile fitness center of claim 17 further including a pair of removable roof covers for enclosing said extended floor surface portions.

* * * * *